United States Patent
Rao et al.

(10) Patent No.: US 10,783,208 B1
(45) Date of Patent: Sep. 22, 2020

(54) SERVER-SIDE AND CLIENT-SIDE UNFURLING OF RESOURCE LOCATORS

(71) Applicant: Amazon Technologies, Inc., Seattle, WA (US)

(72) Inventors: Siddhartha Shankara Rao, Seattle, WA (US); Eric D. Cox, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 15/925,495

(22) Filed: Mar. 19, 2018

(51) Int. Cl.
| | | |
|---|---|---|
| *G06F 17/40* | (2006.01) | |
| *G06F 16/955* | (2019.01) | |
| *H04L 29/06* | (2006.01) | |
| *H04L 12/58* | (2006.01) | |
| *G06F 16/957* | (2019.01) | |

(52) U.S. Cl.
CPC ...... *G06F 16/9566* (2019.01); *G06F 16/9577* (2019.01); *H04L 51/08* (2013.01); *H04L 67/42* (2013.01)

(58) Field of Classification Search
CPC .............. G06F 16/9577; G06F 16/957; G06F 16/9566; G06F 17/2247; G06F 17/2235; H04L 51/08; H04L 67/42
See application file for complete search history.

(56) References Cited

U.S. PATENT DOCUMENTS

| | | | | |
|---|---|---|---|---|
| 6,212,548 B1* | 4/2001 | DeSimone | .......... | H04L 12/1813 709/204 |
| 7,873,707 B1* | 1/2011 | Subramanian | .... | H04L 29/12613 709/219 |
| 8,806,036 B1* | 8/2014 | Chickering | ......... | G06F 16/9577 709/229 |
| 9,385,979 B1* | 7/2016 | Chung | .................. | H04L 51/066 |
| 2007/0256003 A1* | 11/2007 | Wagoner | ............... | G06F 16/958 715/205 |
| 2013/0298006 A1* | 11/2013 | Good | .................... | G06Q 10/107 715/234 |
| 2013/0311906 A1* | 11/2013 | Mackin | ................... | H04L 51/32 715/758 |
| 2014/0289597 A1* | 9/2014 | Kim | ...................... | G06F 16/957 715/205 |
| 2017/0286558 A1* | 10/2017 | Kelleher | ................. | H04L 67/02 |

* cited by examiner

*Primary Examiner* — Wilson W Tsui
(74) *Attorney, Agent, or Firm* — Lee & Hayes, P.C.

(57) ABSTRACT

A service provider may determine that an electronic message sent from a first user device of a first user to a second user device of a second user includes a URL. The service provider may cause the URL to be unfurled, resulting in a preview of the URL, using a combination of a server-based process and a client-based process and one or more policies. Based on the policies, a cloud-based unfurling service may attempt to obtain metadata associated with the URL in order to unfurl the URL. If the server-based unfurling process is unable to unfurl the URL, the first device and/or the second device may obtain the metadata and unfurl the URL. As a result, the recipient of the message (e.g., the second user) may view an unfurled URL that includes a preview of a website corresponding to the URL (e.g., a title/headline, representative text, images, videos, etc.).

20 Claims, 8 Drawing Sheets

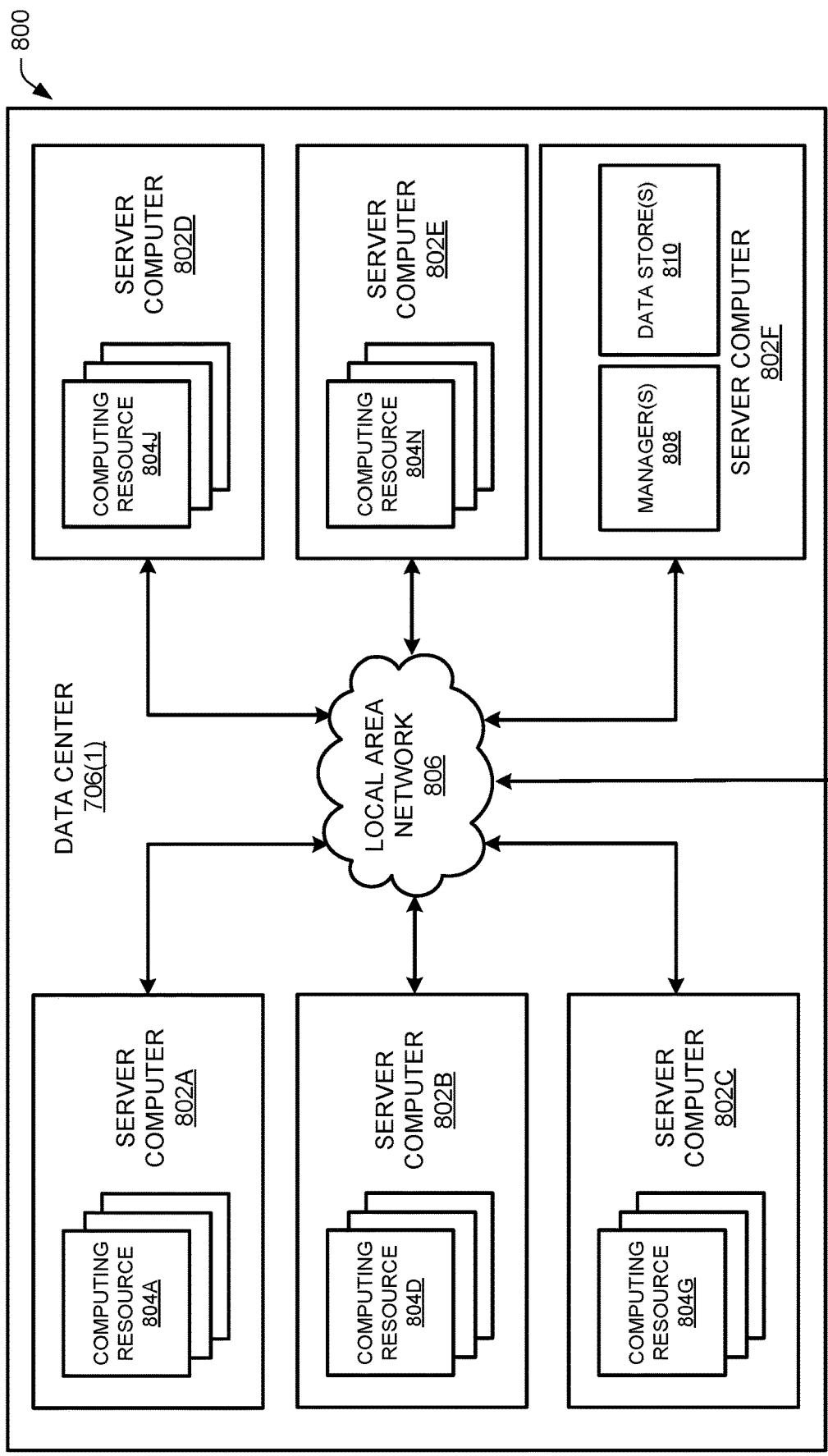

SERVER-SIDE AND CLIENT-SIDE UNFURLING OF RESOURCE LOCATORS

BACKGROUND

Via various types of messaging technology (e.g., chats, e-mails, etc.), users may exchange messages with one another. For instance, via a chat application residing on a user device (e.g., a desktop computer, a laptop computer, a smart phone, a tablet device, etc.), a user may exchange chat messages with other users. Oftentimes a sending user may send one or more messages that include a Uniform Resource Locator (URL) or a link that, when selected by the recipient user, allows the recipient user to navigate to a site (e.g., a website, an intranet site, a document, etc.) associated with the URL/link. In some instances, prior to the URL/link being sent to the recipient user, the URL/link may be unfurled resulting in an unfurled URL/link. The unfurled URL/link may be a preview of the URL/link, which may include text, a title, an image, a video, and so on, that allows the recipient user to learn at least some information regarding the site associated with the URL/link. The unfurling of URLs/links may be effective when the associated site is publicly available, such as a public website accessible via the Internet. However, it may be difficult, if not impossible, to unfurl a URL/link associated with a site that is at least partially restricted or private. In that scenario, the recipient user would not receive the unfurled URL/link, and would have to select/click the URL/link in order to obtain information about the associated site.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 is a block diagram that illustrates one configuration for a data center that implements aspects of a service provider network, including some or all of the concepts and technologies disclosed herein.

DETAILED DESCRIPTION

Figure 1:
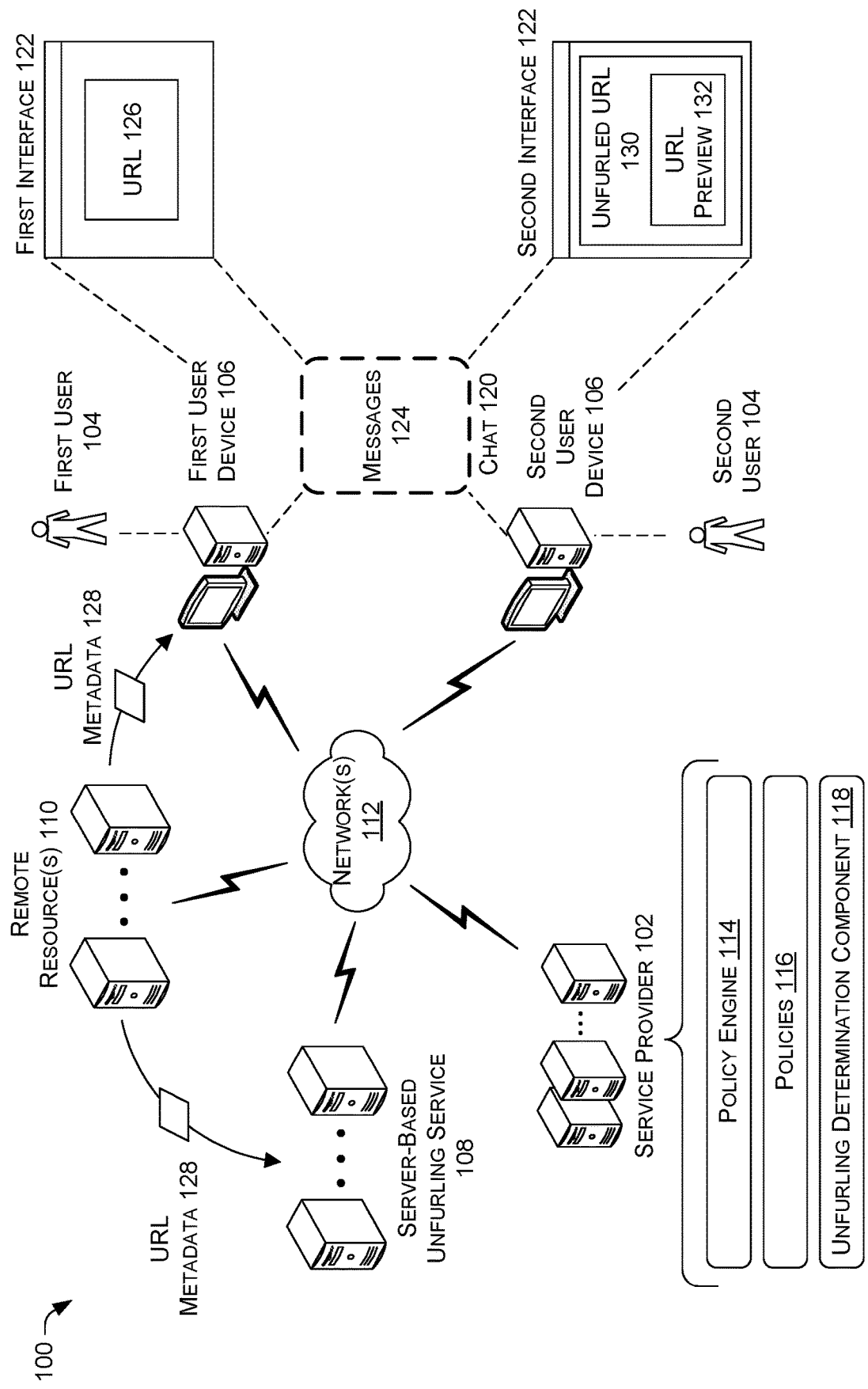
FIG. 1 is a schematic diagram of an illustrative environment that includes a service provider to cause the unfurling of URLs utilizing a client-side process that is based on one or more policies.

This disclosure is directed to unfurling Uniform Resource Locators (URLs) using a combination of a server-based unfurling process and a client-based unfurling process, where the unfurling of the URLs is based on one or more policies associated with a first user that sent a URL (also referred to herein as a "sending user") and/or a second user that is a recipient of the URL (also referred to herein as a "recipient user"). In various embodiments, users may exchange electronic messages via chat rooms, e-mail messages, etc., and some of the electronic messages may include a URL (also referred to herein as a "link"). The sending user may send an electronic message containing a URL to the recipient user via his/her user device. Instead of the recipient user receiving the same URL within the electronic message, the URL may be unfurled and the resulting unfurled URL may be presented to the recipient user via his/her user device. This may result in a richer user experience, as the unfurled URL may include a title (e.g., a headline of an article), a descriptive image or video, or other metadata associated with the URL (or corresponding website). Instead of the recipient user being forced to select or click on the URL to view or obtain information about the URL/website, the unfurled URL may provide a preview of the URL/website such that the recipient user may obtain at least some information about the URL/website, without actually selecting or clicking on the unfurled URL.

In order to unfurl the URL, a server-based process may obtain metadata associated with the URL/website, and the metadata may be used to unfurl the URL. More particularly, a cloud-based unfurling service or process may extract metadata from the website associated with the URL. The metadata may then be rendered back to the sending user device and/or the recipient user device, such as via a mobile application or web browser that is being used to send and receive the messages exchanged between the users. As a result, the server-based process may serve as an intermediary between the sending user device and the recipient user device and may cause the unfurled URL to be presented via the recipient user device of the recipient user. In other embodiments, a client-based process may be used to unfurl the URL. In this scenario, the sending user device and/or the recipient user device may obtain the metadata from the website associated with the URL. Once obtained/extracted, the sending user device or the recipient user device may use the metadata to unfurl the URL, thereby causing the unfurled URL to be presented/displayed via the recipient user device by way of the electronic message (e.g., the chat message, the email message, etc.). In some embodiments, provided that the sending user device obtains the metadata, the metadata may or may not be sent by the sending user device to the recipient user device.

The server-based process is configured to unfurl the URL provided that the cloud-based unfurling service is able to connect to, and access, the URL (or a site corresponding to the URL). For instance, unfurling of the URL will likely be successful utilizing the sever-based process if the URL is associated with a public website that is accessible via the Internet. However, unfurling of the URL using the server-based process may fail if the URL is a link to a private or restricted website, such as an intranet hosted site that only allows authorized users (e.g., employers of a company) to access the site. Provided that the URL is not accessible by the cloud-based service, the URL will not be fully unfurled. As a result, the recipient user will be unable to receive a preview of the URL (i.e., the unfurled URL), and the user instead will have to click/select the URL in order to obtain additional information about the corresponding website.

Accordingly, the systems and processes described herein may utilize a combination of the server-based process and a client-based process to unfurl a URL sent by the sending user to the recipient user. In particular, upon determining that the sending user has sent a URL via a message to the recipient user, a service provider that is associated with the messaging system used by the users may first attempt to unfurl the URL using the server-based process. If the cloud-based service is able to extract metadata needed to unfurl the URL, the cloud-based service may transmit the metadata and/or the unfurled URL to the recipient user device of the recipient user. If the server-based process is unable to unfurl the URL, possibly as a result of the URL being associated with a restricted or private website (e.g., an intranet site), the service provider may utilize the client-based process to unfurl the URL.

In various embodiments, a policy engine may maintain, or at least have access to, one or more policies associated with different users, where the policies may relate to an entity associated with the users (e.g., an employer of a user). Each policy may indicate an extent to which URLs may be selected, accessed, viewed, sent, unfurled, and so on. With respect to a particular URL sent from the sending user device to the recipient user device via a message, the policy engine may determine, based on policies associated with the sending user and/or the recipient user, an extent or depth of unfurling that is authorized for the URL. The extent of unfurling may be based on multiple factors, such as a type of client being used to exchange messages between the users. The type of client may include a web browser, a desktop application, a mobile application, and so on. The extent of unfurling may also be based on characteristics associated with the URL, which may be indicated by the one or more policies and which may include a domain or location associated with the URL. Moreover, the extent of unfurling may be based on characteristics associated with the sending user and/or the recipient user. Such user characteristics may include an employment status of the users with respect to an entity (e.g., employee versus contractor), a level of the users within the entity (e.g., entry level employee versus senior executive), and/or a role of the users within the entity (e.g., a customer service versus management).

The specific policy or policies associated with the sending user and/or the recipient user may be provided to their corresponding user devices being used to engage in the communication session. Depending on whether the sending user device or the recipient user device is to unfurl the URL (e.g., sender-based unfurling or recipient-based unfurling), the sending user device or the recipient user device may unfurl the URL based on the appropriate policies and the extracted metadata. If unfurling of the URL is to be performed by the sending user device, the metadata may be transmitted to the recipient user device via the message, resulting in the unfurled URL being presented via the recipient user device. Transmitting the metadata may prevent other user devices from having to perform the same unfurling operations for that particular URL.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a schematic diagram of an illustrative environment 100 that includes a service provider 102 to facilitate the unfurling of URLs transmitted between user devices via one or more electronic messages (e.g., chat messages, e-mail messages, text messages, etc.). The environment 102 further includes one or more users 104, such as a first user 104 (i.e., the "sending user 104") and a second user 104 (i.e., the "recipient user 104"). Each user 104 may be associated with a corresponding user device 106, such as a first user device 106 (i.e., the "sending user device 106") associated with the first user 104 and a second user device 106 (i.e., the "recipient user device 106") associated with the second user 104. The environment 102 may also include a server-based unfurling service 108, one or more remote resources 110, and one or more networks 112. The network(s) 112 may facilitate communications, and/or the exchange of data, between the various components illustrated in the environment 100, including the service provider 102, the user devices 106, the server-based unfurling service 108, and/or the remote resource(s) 110. In various embodiments, the service provider 102 may maintain, have access to, or otherwise be associated with a policy engine 114, one or more policies 116, and an unfurling determination component 118.

The service provider 102 may be any number of servers, an entity, a platform, etc., that provides products and/or services to the users 104. For instance, the service provider 102 may offer products to the users 104 via an electronic marketplace, a website, a mobile application, and so on. The service provider 102 may also provide data storage services to the users 104, as well as other entities, such as companies, corporations, and other businesses. In addition, the service provider 102 may provide one or more mechanisms that facilitate communication services between the users 104, such as e-mail services, chat services (e.g., a chat application), etc. In conjunction with the communication services, and as described in additional detail with respect to FIG. 1, the service provider 102 may facilitate the unfurling of URLs that are transmitted between the users 104 via a chat 120 (or any other exchange of electronic messages).

In various embodiments, the users 104 may include any individual or entity that interacts with the service provider 102. For instance, the users 104 may include customers of the service provider 102, employees of an entity associated with the service provider 102, or any other individual. Each user 104 may be associated with one or more user devices 106, which may allow the users 104 to exchange communications and/or information/data with other users 104 and/or any other component illustrated in FIG. 1. The user devices 106 may include any type of device, such as desktop computers, laptop computers, mobile telephones (e.g., smartphones), tablet computing devices, electronic book (eBook) reader devices, gaming consoles, or any other type of electronic device.

Via the user devices 106, such as the first user device 106 and the second user device 106, the first user 104 and the second user 104 may engage in any type of communication, such as a chat 120. The chat 120 may be conducted via a web browser, a desktop application, a mobile application, or in any other manner. Via interfaces 122 served to, and presented by, the user devices 106, the first user 104 and the second user 104 may exchange electronic messages 124 (e.g., chat messages 124, text messages 124, e-mail messages 124, etc.) with one another. For instance, via the first interface 122, the first user 104 may send and receive electronic messages 124 from other users 104, such as from the second user 104 via the second user device 106. Likewise, via the second interface 122, the second user 104 may send and receive electronic messages 124 from other users 104, such as from the first user 104 via the first user device 106. The electronic messages 124 exchanged between the users 104 may include a URL 126 (also referred to herein as a "link"). The URL 126, when selected or clicked via a user device 106, may cause the user device 106 to navigate to a site (e.g., a website, an intranet site, a document, etc.) associated with the URL 126. For instance, upon selecting the URL 126, a website associated with the URL 126 may be presented via the interface 122. FIG. 1 illustrates a first user 104 and a second user 104, but it is contemplated that any number of users 104 may be involved in the communication session. For instance, the communication session may correspond to a chat room in which two, three, four, etc., users 104 may be exchanging electronic chat messages 124 with one another at the same time. The communication session may also include a group e-mail message or a group text message exchange in which more than two users 104 are participating. As a result, the URL 126 sent by the first user 104 may be sent to the second user 104, as well as a third user 104, a fourth user 104, and so on.

Moreover, although the term URL 126 is used herein, the URL 126 may be included within a broader category of resource locators (RLs). For instance, RLs may include the URLs 126, Internet resource locators (IRLs), uniform resource identifiers (URIs), and so on. IRLs may convey location and access information for resources, such as network accessible documents, Wide Area Information Server (WAIS) databases, File Transfer Protocol (FTP) servers, and Telnet destinations. URIs may correspond to a string of characters used to identify a resource, and may include media resource locators (MRLs), which may be used to uniquely identify and locate a multimedia resource. The RLs may correspond to any type of data/information, such as websites, sites, electronic documents, HTML files, media content (e.g., images, videos, audio files, etc.), social network information (e.g., posts, messages, etc.), etc.

Provided that an electronic message 124 includes a URL 126, instead of merely transmitting the URL 126 from the first user device 106 to the second user device 106, the URL 126 may be unfurled. Unfurling of the URL 126 may cause information associated with the URL 126 (or the corresponding website) to be presented or rendered via the recipient user device 106. Such information may include a title associated with the website (e.g., a title or headline of an article), text descriptive of the contents of the website, one or more images that are illustrative of, or that are included within, the website, one or more videos that are illustrative of, or that are included within, the website, and/or a social network message 124/post. As a result, unfurling of the URL 126 may allow the recipient user 104 to obtain or learn information about the corresponding website without actually selecting or clicking on the URL 126. Instead, information that is representative, descriptive, and/or illustrative of the site/website is displayed via the unfurled URL.

The service provider 102 may maintain, have access to, or at least be associated with the policy engine 114. As will be discussed in additional detail herein, the policy engine 114 may determine the extent to which a URL 126 transmitted within a message 124 is to be unfurled. The extent to which URLs 126 are to be unfurled may be based on one or more policies 116 (e.g., enterprise policies 116) associated with the users 104. For instance, the policies 116 may be generated and customizable by the service provider 102 or by an entity associated with the first user 104 and/or the second user 104, such as an employer. The policies 116 may indicate types of URLs 126 that are or are not to be selected, viewed, sent, received, unfurled, and so on. The policy engine 114 of the service provider 102 may maintain, or at least have access to, the policies 116.

Upon determining the extent or depth of unfurling of a URL 126, the unfurling determination component 118 of the service provider 102 may facilitate the unfurling of the URL 126. The unfurling of the URL 126 may be based on one or more policies 116, which may indicate that unfurling of the URL 126 is first to be attempted by the server-based unfurling service 108 (e.g., server-based unfurling), which may include one or more cloud computing resources. To unfurl the URL 126, the server-based unfurling service 108 may receive or obtain URL metadata 128 (also referred to herein as "RL metadata 128") from one or more remote resources 110. The remote resources 110 may include websites, intranet sites, documents, etc., associated with the URLs 126. For instance, the remote resources 110 may be a website that is accessible via the Internet, possibly by selecting the URL 126 included within the message 124 sent by the first user device 106. Moreover, the URL metadata 128 may include any information associated with the URL 126, such as a title, text, images, video, etc., relating to the site/document associated with the URL 126. Upon obtaining or extracting the URL metadata 128 from the remote resources 110, the server-based unfurling service 108 may unfurl the URL 126 and send the unfurled URL 130, as well as the URL metadata 128, to the recipient user device 106 (e.g., the second user device 106). The unfurled URL 130 may serve as a URL preview 132 for the recipient user 104 (e.g., the second user 104). For instance, the URL preview 132 may include a title, text, images, video, or any other data associated with the URL 126/website that allows the recipient user 104 to obtain information about the URL 126/website.

In some instances, the server-based unfurling service 108 may be unable to unfurl the URL 126, possibly due to the URL 126 being associated with a website in which access is restricted or private (e.g., an intranet site). For instance, since only authorized individuals may be able to access the site, the server-based unfurling service 108 may be unable to access the site, and therefore unable to obtain/extract the URL metadata 128 associated with the URL 126. The server-based unfurling service 108 may send/output, to the service provider 102, a failure notification indicating that the server-based unfurling service 108 was unable to access the URL 126/website.

Upon determining a failure of the server-based unfurling service 108, the unfurling determination component 118 may facilitate a client-based unfurling of the URL 126. For instance, the first user device 106 (e.g., the sending user device 106) and/or the second user device 106 (e.g., the recipient user device 106) may obtain/extract the URL metadata 128 from the remote resource(s) 110, possibly based on instructions provided by the service provider 102. As will described in additional detail herein, the first user device 106 and/or the second user device 106 may use the URL metadata 128 to unfurl the URL 126, which may result in the unfurled URL 130. In some instances, the service provider 102 may send instructions indicating that the user devices 106 are to unfurl the URL 126 using the URL metadata 128. The unfurled URL 130 and the corresponding URL preview 132 may then be displayed/rendered via the second interface 122 of the second user device 106, possibly in response to an instruction from the service provider 102. Regardless of how the URL 126 is unfurled to generate the unfurled URL 130, the unfurled URL 130 is generated by adding a preview (e.g., a title, descriptive text, an image, a video, etc.), such as the URL metadata 128, to an existing URL 126. As a result, the URL 126 may correspond to the link, whereas the unfurled URL 130 may include the link plus the preview associated with the site/website that corresponds to the URL 126.

Figure 2:
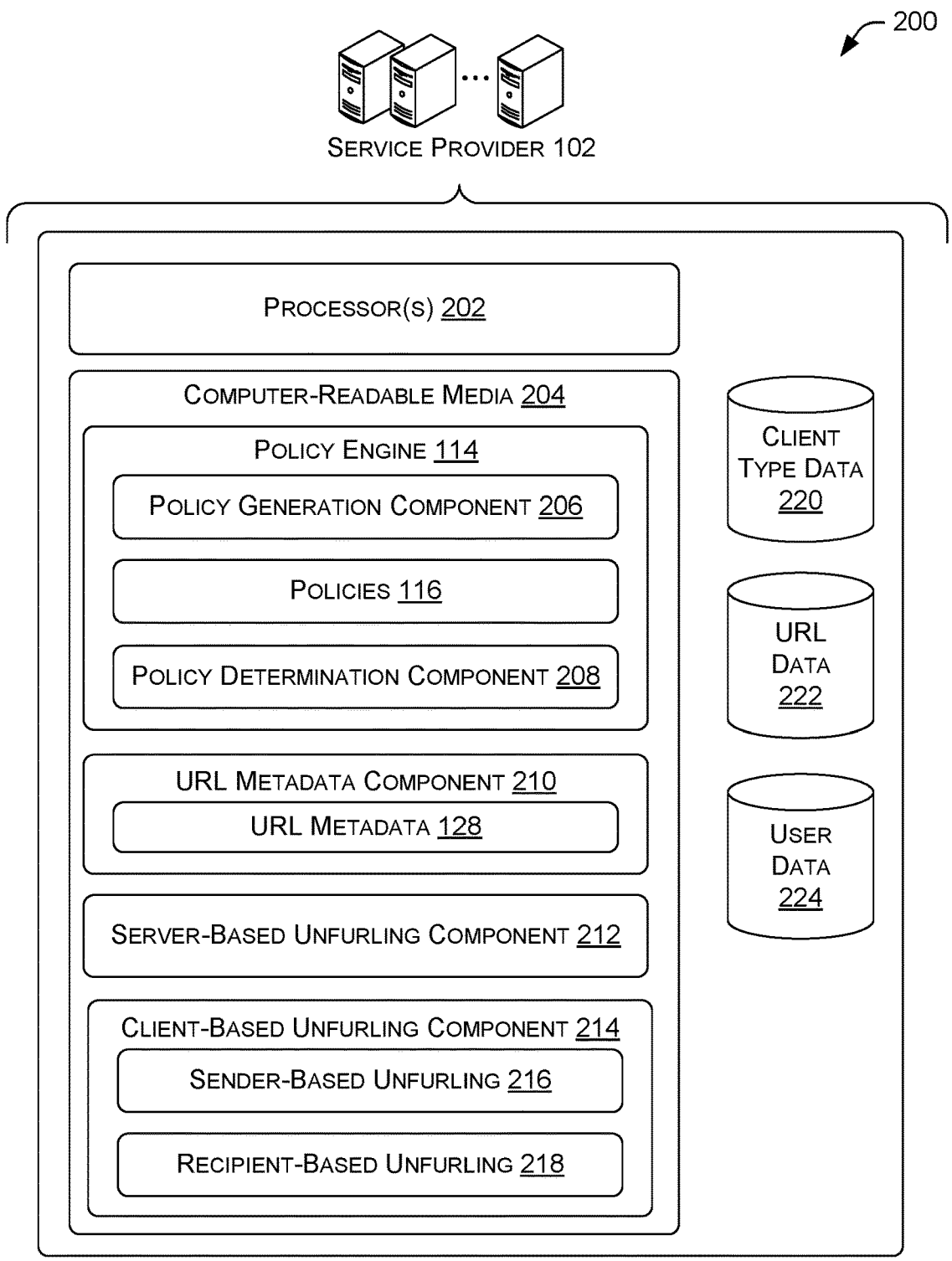
FIG. 2 is a schematic diagram of an illustrative computing architecture of the service provider shown in FIG. 1.

FIG. 2 is a schematic diagram of an illustrative computing architecture 200 of the service provider shown in FIG. 1. The computing architecture 200 may be implemented in a distributed or non-distributed computing environment. The computing architecture 200 may include one or more processors 202 and one or more computer readable media 204 that stores various modules, applications, programs, or other data. The computer-readable media 204 may include instructions that, when executed by the one or more processors 202, cause the processors 202 to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store various modules, engines, and/or components, which may include the policy engine 114. The policy engine 114 may maintain or at least have access to a policy generation component 206, the policies 116, and a policy determination component 208. The computer-readable media 204 may also maintain a URL metadata component 210, a server-based unfurling component 212, and a client-based unfurling component 214, which may facilitate sender-based unfurling 216 and recipient-based unfurling 218. The modules, engines, and/or components may be stored together or in a distributed arrangement. The service provider 102 may also access data including client type data 220, URL data 222, and user data 224.

As stated above with respect to FIG. 1, the service provider 102 may facilitate the unfurling of URLs 126 included within electronic messages 124 sent between user devices 106 of users 104. In various embodiments, the policy engine 114 may determine the extent of unfurling of an URL 126 based on one or more policies 116, such as customized enterprise policies 116. The policy engine 114 may consider and analyze the policies 116 to determine if URLs 126 should or should not be unfurled generally, and to determine whether particular URLs 126 should or should not be unfurled in different contexts. Provided that the policy engine 114 determines that a particular URL 126 is to be unfurled, the policy engine 114 may determine an extent to which the URL 126 is to be unfurled, which may be based on the policies 116.

Based on the policy 116 associated with a user 104 and/or an entity associated with that user 104 (e.g., an employer), the policy engine 114 may dictate which URLs 126 the user 104 is able to select, view, receive, send, etc. The policy engine 114 may also determine which URLs 126 are to be unfurled with respect to the user 104, as well as an indication of how URLs 126 are to be unfurled. For instance, the URL(s) 126 may be unfurled via a server-based process (e.g., by the server-based unfurling service 108), via a client-based process (e.g., by the sending user device 106 and/or the recipient user device 106), or a combination thereof. Depending upon characteristics of a particular URL 126, such as whether the URL 126 corresponds to a public website or a restricted/private site (e.g., an intranet site), the policy engine 114 may define how the unfurling of the URL 126 is to occur. If the URL 126 is to be at least partially unfurled using a client-based process (e.g., by a user device 106), the policy engine 114 identifies whether the sending user device 106 or the recipient user device 106 is to obtain/extract the URL metadata 128 associated with the URL 126. The policy engine 114 may further determine whether the sending user device 106 is to transmit the URL metadata 128 along with the electronic message 124 containing the URL 126. For instance, if the sending user 104 and the recipient user 104 are associated with the same entity (e.g., employees of the same employer), a policy 116 may indicate that the URL metadata 128 is to be sent with the message 124 containing the URL 126. Otherwise, the policy 116 may indicate that the recipient user device 106 is to obtain the URL metadata 128, and the policy engine 114 may send such an instruction.

The policy generation component 206 may generate and/or maintain the policies 116. In some embodiments, an individual associated with an entity may generate the policies 116 for the entity, which may be applied to users 104 associated with that entity. For instance, the individual may be a system or information technology (IT) administrator that is responsible for the maintenance, configuration, and/or reliable operation of computer systems of the entity, including multi-user computers, such as servers. The policies 116 may also be generated in an automated manner with little to no human interaction. As a result, the policies 116 may apply to, but are independent from, the users 104 associated with the entity. The policy generation component 206 may generate and maintain different policies 116 for different users 104, different accounts, different groups, different roles, etc. associated with the entity. For instance, a first policy 116 associated with a first user 104 of the entity may be different than a second policy 116 associated with a second user 104 of the entity. Each user 104 may have a user profile/account maintained by the service provider 102, and one or more policies 116 may be maintained in association with the user profile/account.

In certain embodiments, the policies 116 are not specific to individual users 104, but are instead deployed in certain contexts in which the policies 116 apply. That is, policies 116 may be generated based on employment status, roles within the entity, level within the entity, and so on. The policies 116 may be further based on the specific URL 126 at issue and the mechanism in which the URL 126 is to be viewed, sent, received, etc. (e.g., a web browser, a desktop application, a mobile application, etc.). As a result, based on the current context associated with the users 104 engaged in a communication session (e.g., a chat 120) and/or the specific URL 126 that is to be unfurled, the policy determination component 208 may select a policy 116 that is to be applied. The policy determination component 208 may consider various factors in order to determine the current context. Such factors may include characteristics about the URL 126, a source of the URL 126, a time at which the URL 126 is sent, the identity of the user 104 that sent the URL 126, characteristics about that sending user 104, the identity of the user 104 that is to receive the URL 126, characteristics about that recipient user 104, the user devices 106 being used to send and/or receive the message 124 containing the URL 126, a network 112 being used to transmit the message 124/URL 126, an entity associated with the sending user 104 and/or the recipient user 104, etc. The policy engine 114 may identify those factors/criteria at a time prior to, or when, the message 124 containing the URL 126 is sent, and then select the appropriate policy 116 to apply with respect to unfurling the URL 126.

The following is an illustrative example of a policy 116. Here, the policy 116 is attached or associated with a user 104 and corresponds to a defined list of Statements (also referred to herein as "Policy Statements"). Each Policy Statement may have an (1) Effect, (2) a list of Actions, and (3) a list of Resources. Policy Statements may be executed in the order that they are defined and, if two Policy Statements conflict, then the last executed Policy Statement takes precedence and will control. Moreover, for each Policy Statement, the Effect can be either "Allow" or "Deny." An Action list details the specific Actions that the Effect applies to, and the Resource list details the resources applicable for the policy 114. For the purpose of this discussion, the resources that are applicable for the policy 114 may include the URLs 126 and the recipient users 104, and possibly the sending users 104 and an entity associated with the users 104. For instance, assume that a policy 116 authorizes a user 104 to receive all URL metadata 128, and also authorizes the user 104 to send all URL metadata 128, with the exception of one or more domains (e.g., www.amazon.com, amazonaws.com, etc.), and with the exception of the user 104 sending an account ID (e.g., "123456"), which may simulate other employees of the entity/employer of the user 104. In this scenario, the policy 116 may constitute:

```
{
  "Version": "2012-10-17",
  "Statement": [
    {
      "Effect": "Allow",
      "Action": [
        "unfurl:sendMetadata",
        "unfurl:receiveMetadata"
      ],
      "Resource": [
        "url:*",
        "recipient:"
      ]
    }
    {
      "Effect": "Deny",
      "Action": [
        "unfurl:sendMetadata"
      ],
      "Resource": [
        "url:*.amazon.com",
        "url:*.amazonaws.com",
        "recipient:"
      ]
    }
    {
      "Effect": "Allow",
      "Action": [
        "unfurl:sendMetadata"
      ],
      "Resource": [
        "url:*.amazon.com",
        "url:*.amazonaws.com",
        "recipient:awsAccountId:123456"
      ]
    }
  ]
}
```

An illustrative example with respect to the policy engine 114 and unfurling a URL 126 is set forth below. Assume that a first user 104 and a second user 104 are engaged in a chat session using corresponding user devices 106. Further assume that the first user 104 has sent, to the user device 106 of the second user 104, a chat message 124 that contains a URL 126. Prior to facilitating the transmission of the chat message 124 to the second user 104, the policy engine 114 may identify policies 116 associated with the first user 104 and/or the second user 104. For instance, the policy engine 114 may identify a first policy 116 associated with the first user 104, where the first policy 116 states that URLs 126 sent by the first user 104 are to be unfurled using a server-based process. As a result, URLs 126 sent by the first user 104 via chat messages 124 with the second user 104 are to be unfurled using the server-based unfurling service 108 pursuant to the first policy 116. On the other hand, a second policy 116 associated with the second user 104 may indicate that URLs 126 may be unfurled using a server-based process or a client-based process, such that URLs 126 are authorized to be unfurled using the server-based service 108, or using a user device 106. As a result, the first user 104 may receive an unfurled URL 130 via a server-based process, and the second user 104 may receive an unfurled URL 130 via a server-based process, a client-based process, or a combination thereof.

The URL metadata component 210 may cause URL metadata 128 to be obtained or extracted from the remote resource(s) 110. In the server-based unfurling context, the URL metadata component 210 may cause or instruct the server-based unfurling service 108 to obtain or extract the URL metadata 128 from the remote resource(s) 110, where the remote resource(s) 110 may be a website that corresponds to a URL 126 included within an electronic message 124 sent between two user devices 106. However, provided that client-based unfurling is being utilized, a sending user device 106 and/or a recipient user device 106 may obtain or extract the URL metadata 128, and the URL metadata component 210 may cause at least one of the user devices 106 to obtain or extract the URL metadata 128. The URL metadata 128 can be any type of data associated with the website/site associated with the URL 126, such as a title/heading, text, images, video, and so on. The URL metadata 128 may be obtained or extracted based on the header of the website/site, a body of the website, Hypertext Markup Language (HTML) associated with the website/site, and/or utilizing one or more tags, such as Open Graph (OG) meta tags, Twitter® card tags, or any other type of meta tags.

Regardless of how the URL metadata 128 is obtained or extracted, the server-based unfurling component 212 may cause a URL 126 contained within a message 124 to be unfurled using a server-based process. Upon the sending user 104 sending an electronic message 124 to the recipient user 104, the service provider 102 may identify a URL 126 contained within the message 124. A relevant policy 116 may indicate that unfurling of the URL 126 is first to be attempted using the server-based unfurling service 108. To unfurl the URL 126, the server-based unfurling service 108 (e.g., a cloud-based unfurling service) may obtain/extract the URL metadata 128 from the remote resource(s) 110 and unfurl the URL 126 using the URL metadata 128. The unfurled URL 130 generated/rendered by the server-based unfurling service 108 may be a preview of the website/site corresponding to the URL 126 (i.e., URL preview 132), and the server-based unfurling service 108 may send the unfurled URL 130 to the user device 106 of the recipient user 104. As a result, instead of the recipient user 104 merely viewing a URL 126 or link within the electronic message 124 via his/her user device 106, the recipient user 104 may view a preview of the URL 126, which may include a heading/title, text, an image, and/or a video that provides information about the website/site.

Upon identifying a URL 126 within a message 124, the service provider 102 may first attempt to unfurl the URL 126 using server-based unfurling, provided that a policy 116 indicates that such an approach is desired. The URL 126 may be unfurled by the server-based unfurling service 108 when the URL 126 corresponds 126 to a public site, such as a website that is publicly accessible via the Internet. Although the server-based unfurling service 108 may unfurl certain URLs 126 and cause previews of unauthenticated content from public websites, the server-based unfurling service 108 may be unable to unfurl URLs 126 that correspond to restricted or private sites, such as an intranet site of a business/company. If the URL 126 corresponds to such a restricted or private site, the server-based unfurling service 108 may not have authorization to access that site and, as a result, would not be able to generate/render an unfurled URL 130 for that URL 126. The recipient user 104 would be able to view the URL 126 itself, but not a preview of authenticated content, intranet content, etc. associated with a site/website corresponding to the URL 126. As an illustrative example, assume that a first user 104 sends a URL 126 via an electronic message 124 to a second user 104, where the first users 104 are employees of the same company and the URL 126 is a restricted intranet site associated with that company. Although each of the users 104 is likely to have authorization to access the intranet site, the server-based unfurling service 108 likely would not have authorization to access that site. As a result, the second user 104 would only see the URL 126, and not an unfurled URL 130 that includes a preview of the URL 126.

In various embodiments, the service provider 102 may receive an error message or notification in the event the server-based unfurling service 108 is unable to access the URL 126 contained within the message 124 (or the corresponding website) and/or is unable to unfurl the URL 126. Such error messages/notifications may include a "500 Internal Server Error," which is a general HTTP status code that indicates that an error has occurred. The error message/notification may also be a "HTTP 404," "404 Not Found," or "404" error message, which is a HTTP standard response code that indicates that a device was able to communicate with a server, but that the server was unable to identify the requested information. Moreover, the error message/notification may include a "HTTP Error 401—Unauthorized," indicating that access to a server/website was denied due to invalid credentials. That is, the error messages/notifications may indicate that the server-based unfurling process was unable to access the particular URL 126/website.

Provided that the service provider 102 receives an error message/notification in response to an attempt to unfurl the URL 126 using the server-based unfurling process, the service provider 102 may automatically initiate client-based unfurling, where at least one of the sending user device 106 or the recipient user device 106 unfurls the URL 126. Client-based unfurling may be implemented provided that an appropriate policy indicates that such an unfurling approach is desired or preferred. As discussed in additional detail below, the sending user device 106 and/or the recipient user device 106 may obtain/extract the URL metadata 128 from the remote resource(s) 110 and unfurl the URL 126 based on the policies 116 associated with those user devices 106, and possibly in response to instructions sent by the service provider 102. For instance, the sending user device 106 may unfurl the URL 126 using the URL metadata 128 and, provided that a policy 116 indicates that the recipient user device 106 is authorized to receive/render unfurled URLs 130 from the sending user device 106, then the sending user device 106 sends the unfurled URL 130 and the URL metadata 128 to the recipient user device 106 via the message 124. Based on that policy 116, the recipient user device 106 may then render the unfurled URL 130 for viewing by the recipient user 104.

In some instances, the service provider 102 may generate and maintain a list of websites (e.g., or other sites, documents, etc.) in which the server-based unfurling service 108 likely will not have access. Such websites may include intranet sites or other websites in which access is at least partially restricted. If the service provider 102 determines that the URL 126 contained within the message 124 matches one of those websites, then the server-based unfurling process may be bypassed. That is, the service provider 102 may not attempt server-based unfurling if the server-based unfurling service 108 is likely to have authorization to access the URL 126 in question. In particular, upon determining that an electronic message 124 includes a URL 126, the service provider 102 may determine whether the domain name of the URL 126 matches a particular string sequence or regular expression. Since those string sequences may indicate that the server-based unfurling service 108 will not have access to the URL 126, the service provider 102 may determine that client-based unfurling will have to be deployed in order to unfurl the URL 126. In that scenario, the service provider 102 may avoid attempting to unfurl the URL 126 using the server-based unfurling process, and may instead instruct the sending user device 106 and/or the recipient user device 106 to unfurl the URL 126.

Provided that the server-based unfurling component 212 is unable to unfurl a URL 126 contained within an electronic message 124 sent from a first user device 106 to a second user device 106, the client-based unfurling component 214 may facilitate the unfurling of the URL 126 using client-based unfurling. The client-based unfurling component 214 may deploy, or trigger initiation of, sender based unfurling 216 performed by the sending user device 106 or recipient-based unfurling 218 performed by the recipient user device 106. The determination of whether sender-based unfurling 216 or recipient-based unfurling 218 is performed may be based on one or more policies 116 associated with the sending user 104 and/or the recipient user 104.

The client-based unfurling component 214 may cause the sending user device 106 and/or the recipient user device 106 to unfurl the URL 126 included within the message 124. To do so, one of the user devices 106 may request, obtain, or extract the URL metadata 128 associated with the URL 126 from the remote resource(s) 110. This may occur via the medium in which the communication session is taking place between the two user devices 106, such as via a desktop web browser, a desktop application, a mobile web browser, a mobile application, and so on. Upon receiving, obtaining, or extracting the URL metadata 128, the sending user device 106 and/or the recipient user device 106 may unfurl the URL 126 using the URL metadata 128. In some instances, and based on the appropriate policy 116, the sending user device 106 may send the unfurled URL 130 and the URL metadata 128 to the recipient user device 106. In other embodiments, a policy 116 may indicate whether the sending user device 106 is able/authorized to send the URL metadata 128 to the recipient user device 106, and/or whether the recipient user device 106 is able/authorized to receive the URL metadata 128 from the sending user device 106. Whether a user device 106 is able/authorized to obtain, send, and/or receive the URL metadata 128 pursuant to one or more policies 116 may be based on the URL 126 itself, the sending user 104, the recipient user 104, and so on. As a result, the users 104 and/or the user devices 106 are self-aware with respect to the policies 116 that are associated with the users 104 and/or the user devices 106.

A policy 116 may indicate that sender-based unfurling 216 is to be used to unfurl the URL 126 contained within the electronic message 124. In sender-based unfurling 216, the URL metadata 128 associated with the URL 126 may be obtained/extracted by the sending user device 106, or the user device 106 that is sending the message 124/URL 126 to the recipient user device 106. The sending user device 106 may unfurl the URL 126 using the URL metadata 128, resulting in the unfurled URL 130. The unfurled URL 130 may be sent with the message 124 to the recipient user device 106. Depending on the policy 116 associated with the sending user device 106 and/or the recipient user device 106, the sending user device 106 may sent the URL metadata 128 along with the unfurled URL 130 contained within the electronic message 124. This URL metadata 128 may include the session token and/or security controls appropriate for that website that corresponds to the URL 126. In other embodiments, the sending user device 106 may withhold the URL metadata 128 from the recipient user device 106. Regardless, upon receiving the message 124, the recipient user device 106 may render the unfurled URL 130 for presentation to the recipient user 104, thereby allowing the recipient user 104 to view a preview of the website corresponding to the URL 126.

As an illustrative example, assume that the sending user 104 and the recipient user 104 are employees of the same organization, that a policy 116 associated with the users 104 indicates that URLs 126 may be sent/received, unfurled, etc., between corresponding user devices 106, and that a URL 126 sent by the sending user device 106 to the recipient user device 106 is an intranet site of the organization (or some other restricted site). As a result, the server-based unfurling service 108 likely would not have access to this site, and would therefore be unable to unfurl the URL 126. In response to receiving an error notification described above, or otherwise determining that the server-based unfurling service 108 is unable to unfurl the URL 126, the sending user device 106 may obtain the URL metadata 128 associated with the URL 126 and unfurl the URL 126. The sending user device 106 may then send the resulting unfurled URL 130 to the recipient user device 106. Since the users 104 are within the same organization and based on the policy 116, the sending user device 106 may be authorized to send, and the recipient user device 106 may be authorized to receive, the URL metadata 128 along with the electronic message 124/unfurled URL 130. However, if the server-based unfurling service 108 is unable to unfurl the URL 126, but the users 104 are not within the same organization, the service provider 102 may elect to not have the sending user device 106 send the URL metadata 128. The appropriate policy 116 may indicate that as well. Or, the service provider 102 may cause the recipient user device 106 to obtain the URL metadata 128 and unfurl the URL 126 for rendering on the recipient user device 106.

The service provider 102 may deploy or cause inhiation of recipient-based unfurling 218 based on the policies 116 associated with the sending user device 106 and/or the recipient user device 106. In recipient-based unfurling 218, the recipient user device 106 may unfurl the URL 126 sent by the sending user device 106. Although the sending user device 106 may or may not unfurl the URL 126, the recipient user device 106 may obtain/extract the URL metadata 128 associated with the URL 126 and unfurl the URL 126 using the URL metadata 128, resulting in an unfurled URL 130 that is to be rendered by the recipient user device 106. That is, even though the sending user device 106 may have unfurled the URL 126, a policy 116 may indicate that the URL metadata 128 is not to be sent by, or is not to be received from, the sending user device 106. As a result, the recipient user device 106 obtains/extracts the URL metadata 128 in recipient-based unfurling 218, and merely receives the electronic message 124 containing the URL 126.

Illustrative examples of sender-based unfurling 216 and recipient based unfurling 218 are set forth below. Assume that a policy 116 states that a first user 104 of an entity (e.g., an employer) has access to a private/restricted website via his/her user device 106. For instance, this website may be an intranet site of the entity. Further assume that the first user 104 sent, via an electronic message 124, a URL 126 of the website to a second user 104 of the same entity. The policy 116 may state that unfurling of the URL 126 should first be attempted via a server-based unfurling process, such as by the server-based unfurling service 108. However, due to the restricted nature of this website, the server-based unfurling service 108 is unable to unfurl the URL 126. The policy 116 may further state that, if a server-based process to unfurl the URL 126 fails, then a client-based unfurling process may be implemented. Further, the policy 116 may indicate that, if the two users 104 are both employees of the same entity, then sender-based unfurling 216 may be deployed. However, if one of the users 104 is not an employee of the entity, then recipient-based unfurling 218 is to be utilized. Since, the two users 104 are both employees of the same entity, the user device 106 of the first user 104 may obtain the appropriate URL metadata 128 and use that URL metadata 128 to unfurl the URL 126. The unfurled URL 130, as well as the URL metadata 128 may be sent to the user device 106 of the second user 104 per the policy 116. The second user device 106 may then render the unfurled URL 130. That is, since both users 104 are associated with the same entity, the second user 104 is able to trust the URL metadata 128 and render the unfurled URL 130 natively without having to again unfurl the URL 126. In this scenario, the service provider 102 implements sender-based unfurling 216. However, if the two users 104 are not both employed by the entity, then the user device 106 of the second user 104 (i.e., the recipient user 104) would obtain/extract the URL metadata 128 and unfurl the URL 126 per the policy 116. In the latter scenario, the service provider 102 implements recipient-based unfurling 218.

A benefit of sender-based unfurling 216 may be reduced latency associated with sending and receiving messages 124 that contain a URL 126. That is, in sender-based unfurling 216, only the sending user device 106 has to obtain the URL metadata 128 and unfurl the URL 126. However, if both the sending user device 106 and the recipient user device 106 have to unfurl the URL 126, increased latency will likely result, causing a delay in the recipient user device 106 receiving and rendering electronic message 124 and the unfurled URL 130. If the recipient user device 106 is able to trust the content sent by the sending user device 106 and render the unfurled URL 130 natively without having to unfurl the URL 126 a second time, latency will be reduced.

In some scenarios, however, they may be concerns regarding the security of the content sent by the sending user device 106. If a policy 116 indicates that content (e.g., URL metadata 128) from a sending user device 106 is not to be trusted, or if the URL 126 possesses security risks, then recipient-based unfurling 218 may be implemented. That is, the recipient user device 106 may obtain the URL metadata 128 and unfurl the URL 126 for rendering via the recipient user device 106. Although additional latency may result, security risks associated with the URL 126/URL metadata 128 may be reduced, or at least minimized.

The extent or depth of unfurling of a URL 126 contained within a message 124 sent from a first user device 106 to a second user device 106 may be based on various types of data, which may be considered by the policies 116. For instance, the extent of unfurling performed by the server-based unfurling service 108, the sending user device 106, and/or the recipient user device 106 may be based on client type data 220. The client type data 220 may indicate a type of client being used by the users 104 to engage in the communication session (e.g., the chat 120, e-mail messages 124, etc.). The types of clients may include browser clients, desktop clients, and mobile clients. Browser clients may include different web browsers, such as web browsers provided by different entities that allow users 104 to access websites via the Internet (e.g., Chrome, Internet Explorer, Firefox, etc.). Desktop clients may reside on computing devices (e.g., laptop computers, desktop computers, etc.), and may include a Windows desktop, a Mac desktop, etc. Moreover, mobile clients may include operating systems and/or mobile applications that reside on mobile devices (e.g., mobile telephones, tablet devices, etc.), such as Android, IOS, and so on. Different types of clients may pose different levels and types of security risks (e.g., scripting attacks), and may be considered regarding whether a URL 126 should be unfurled or not and, if so, how the URL 126 is to be unfurled.

The policies 116 may also be generated based on URL data 222, which may correspond to various characteristics of a URL 126 (e.g., domain name of URL 126, a location associated with the URL 126, etc.). For instance, upon determining that an electronic message 124 sent by a first user device 106 to a second user device 106 includes a URL 126, the service provider 102 may compare the URL 126 to a list of known URLs 126, such as a database of websites. Such websites may be known to contain inappropriate or obscene content, may pose various security risks (e.g., malware, viruses, etc.), or may not be trusted for various other reasons. If the domain name of the URL 126 referenced above matches one of these known sites, the service provider 102 may elect to not unfurl that URL 126, or may only perform a limited unfurling of the URL 126. For example, the service provider 102 may only extract a title/heading associated with the URL 126, as opposed to including descriptive text, images, videos, etc. The list of sites may also include websites or other sites that are restricted/private and thus not publicly accessible. If it is determined that the URL 126 matches one of the list of restricted/private sites, the service provider 102 may elect to forego attempting to unfurl the URL 126 using server-based unfurling. That is, rather than causing the server-based unfurling service 108 to unfurl the URL 126, the service provider 102 may conclude that the URL 126 is likely inaccessible to the server-based unfurling service 108 and instead initiate client-based unfurling by the sending user device 106 and/or the recipient user device 106. In other embodiments, the service provider 102 may maintain a list of locations (e.g., countries) that pose a higher security risk. If the URL 126 is determined to have a location associated with one of these known locations, the service provider 102 may elect to not unfurl the URL 126.

The policies 116 generated by the service provider 102 may also be based on user data 224. The user data 224 may include characteristics about the users 104 that are engaged in the communication session. Provided that a user 104 is employed by, or is otherwise associated with, an entity (e.g., a corporation, company, etc.), the user data 224 may include a level of the user 104 with respect to the entity, a role of the user 104 with respect to the entity, a type of position with respect to the entity, and so on. For instance, regarding a level of the user 104, the policies 116 may indicate that URLs 126 are not to be unfurled for lower level employees (e.g., entry level), but are to be unfurled for higher level employees (e.g., executives, vice presidents, board members, etc.). The role of the user 104 may include whether the user 104 is a full-time employee, a part-time employee, a contractor, a vendor, etc. The policies 116 may state that URLs 126 are to be unfurled for full-time employees and part-time employees, but not for contractors or vendors. Moreover, the extent of unfurling of a URL 126 may be based on the level, role, or type of position of the user 104. For example, URLs 126 may be fully unfurled for certain levels/roles/types of positions, meaning that a header/title, descriptive text, images, videos, etc., may be included in the preview of the URL 126. For other levels/roles/types of positions, a limited unfurling of the URL 126 may be implemented, where some but not all of the header/title, descriptive text, images, videos, etc., may be included in the URL preview 132. Moreover, a greater extent of unfurling of URLs 126 or the unfurling of all URLs 126 may be implemented for personnel that are associated with the security of the entity (e.g., IT personnel, administrators, etc.). Unfurling of URLs 126 including inappropriate content, security risks, etc., may be authorized for such users 104.

Although a level, role, and/or position type of a user 104 with respect to an entity may be considered when generating the policies 116, other characteristics associated with users 104 may also be considered. Such user characteristics need not be related to an employment of the user 104. For instance, such characteristics may include a determination of a current location of the user 104, whether the user 104 is currently authenticated via a virtual private network (VPN), a search, browse, viewing, and/or purchase history of the user 104, and so on.

Accordingly, the systems and processes described herein provide one or more technological solutions to one or more technological problems. In particular, a cloud-based unfurling service may be unable to unfurl URLs 126 contained in electronic messages 124 (e.g., e-mail messages 124, chat messages 124, text messages 124, etc.) when the URLs 126 correspond to sites/websites that are restricted or private. Such sites include intranet sites or websites that are only accessible to users 104 that have been authorized to access the website, possibly as a result of providing consideration for a subscription or membership to the website. As a result, when a URL 126 is contained within an electronic message 124, and when that URL 126 corresponds to a restricted/private site, a server-based unfurling service 108 will be unable to obtain the necessary data (i.e., URL metadata 128) to generate the unfurled URL 130. Consequently, the recipient user 104 of the electronic message 124 will only receive the URL 126/link, as opposed to an unfurled URL 130 that provides a preview (e.g., a header/title, descriptive text, illustrative images and/or video, etc.) of the site/website corresponding to the URL 126. Such a technological problem is solved by the client-based unfurling processes described herein, as well as a combination of the server-based unfurling processes and the client-based unfurling processes. In particular, a URL 126 contained within an electronic message 124 may still be unfurled although the URL 126 corresponds to a restricted or private site/website. The sending user device 106 and/or the recipient user device 106 may obtain/extract the URL metadata 128 needed to unfurl the URL 126, which will allow the recipient user device 106 to render an unfurled URL 130 for the recipient user 104. This technological solution to a technological problem results in a richer customer experience for the users 104 of an electronic communication session.

Additional information about the operation of service provider 102 is discussed below by way of flow diagrams. The flow diagrams include blocks that may be performed by the various components discussed above, and possibly by other similar types of components.

Figure 3:
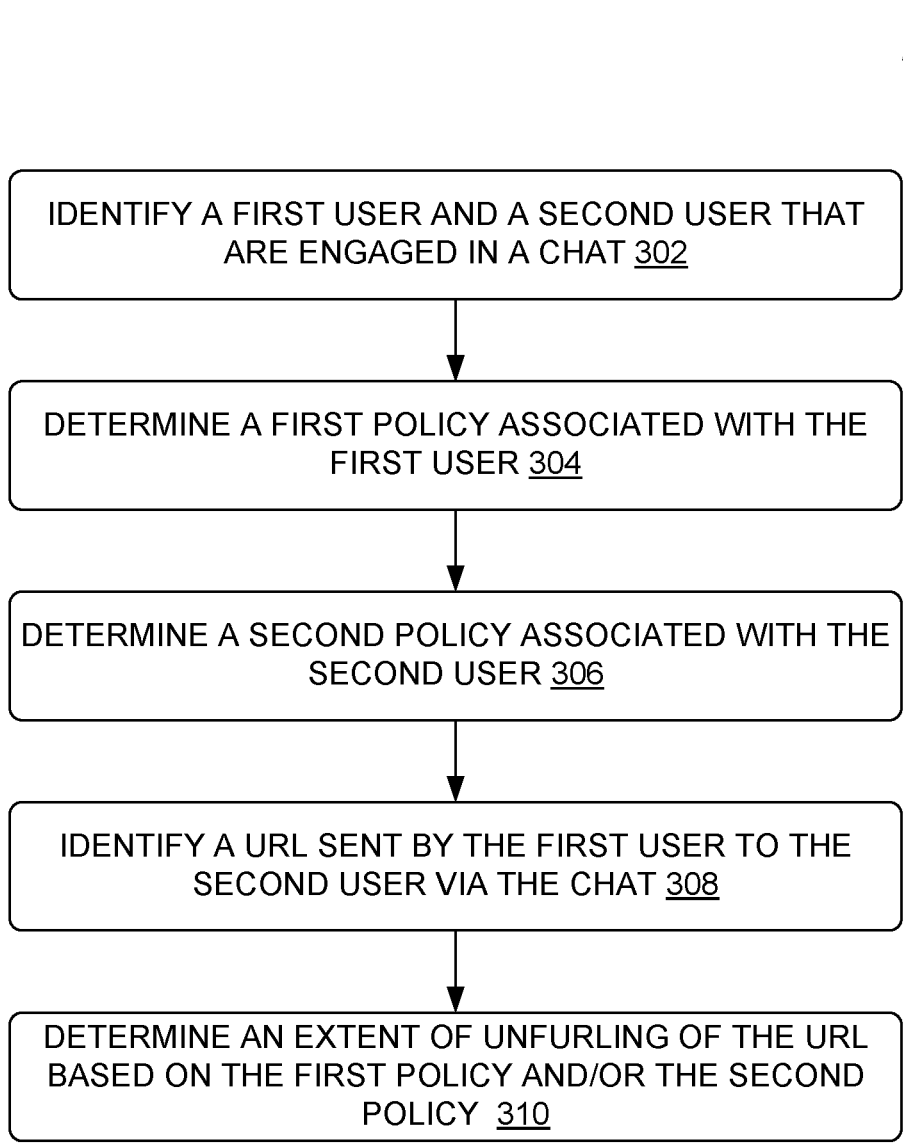
FIG. 3 is a flow diagram of an illustrative process to unfurl a URL based on one or more policies associated with a sending user and/or a recipient user.
Figure 4:
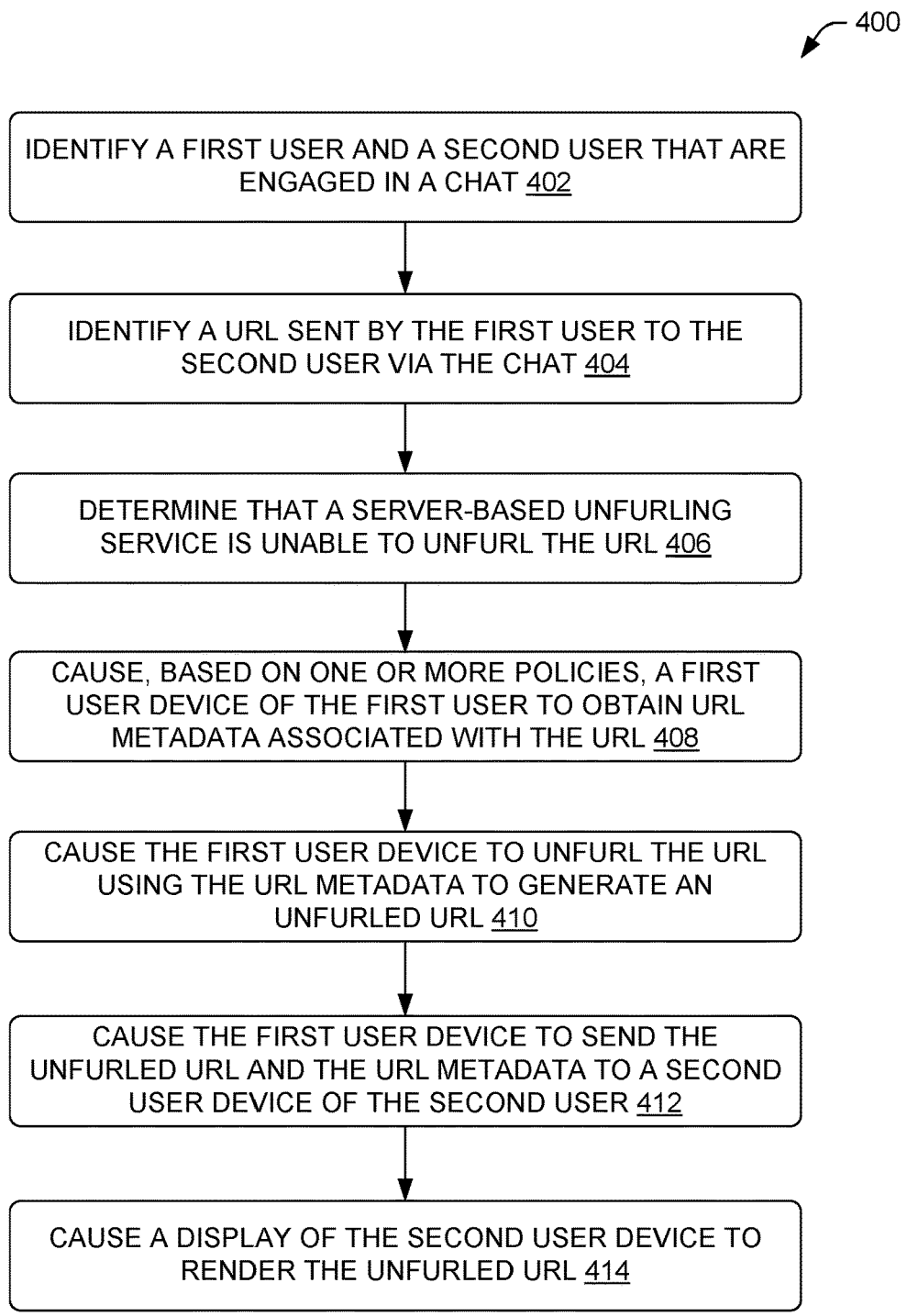
FIG. 4 is a flow diagram of an illustrative process to unfurl a URL using a client-based process in which a sending user device sends an unfurled URL and metadata associated with the URL to a recipient user device.
Figure 5:
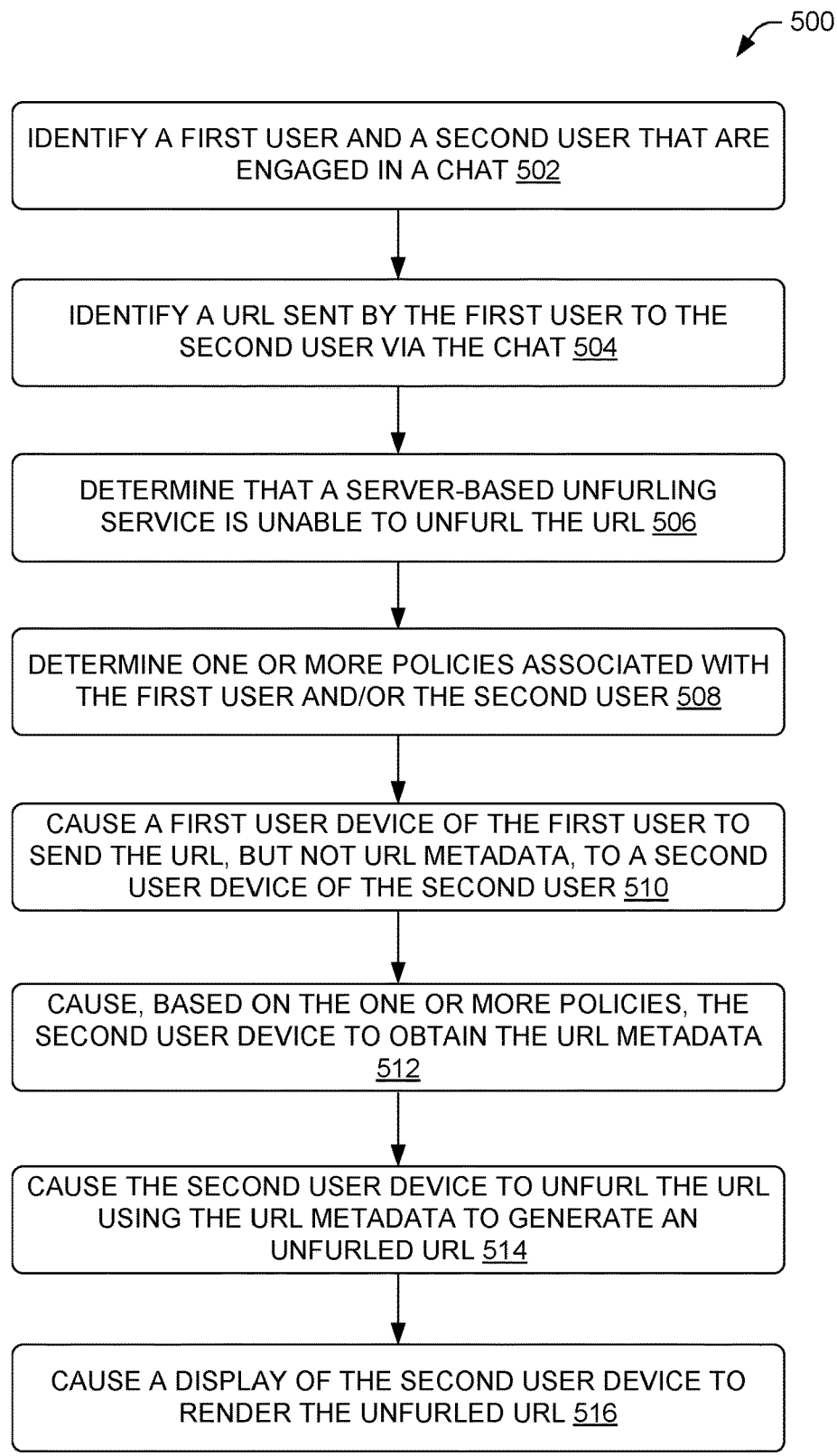
FIG. 5 is a flow diagram of an illustrative process to unfurl a URL using a client-based process in which a sending user device sends a URL to a recipient user device, which unfurls the URL based on metadata associated with the URL.

FIGS. 3-5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure shall be interpreted accordingly.

FIG. 3 is a flow diagram of an illustrative process 300 to determine an extent of unfurling of a URL contained within an electronic message based on one or more policies associated with users engaged in a communication session. The process 300 is described with reference to the environment 100 and the computing architecture 200 illustrated in FIGS. 1 and 2, respectively. Of course, the process 300 may be performed in other similar and/or different environments.

At 302, the service provider 102 may identify a first user 104 and a second user 104 that are engaged in a chat 120. In some embodiments, the first user 104 and the second user 104 may engage in any type of communication session using corresponding user devices 106, such as a chat 120, an exchange of e-mail messages 124, an exchange of text messages 124, and so on. The users 104 may engage in the communication session via a desktop web browser, a desktop application, a mobile web browser, a mobile application, and so on.

At 304, the service provider 102 may determine a first policy associated with the first user 104. More particularly, the service provider 102 or an entity associated with the first user 104 may generate a policy 116 that governs/dictates an extent to which URLs 126 are to be unfurled for (or by) the first user 104. The policy 116 may be based on various types of data/characteristics, such as the client type data 220, the URL data 222, and/or the user data 224. Moreover, the first policy 116 may indicate whether URLs 126 are to be unfurled via server-based unfurling and/or client-based unfurling, and/or whether the first user 104 is authorized to view, send, receive, etc. URLs 126 and unfurled URLs 130. The first policy 116 may also dictate whether the first user 104 is authorized to obtain/extract and/or receive URL metadata 128 associated with different URLs 126.

At 306, the service provider 102 determines a second policy 116 associated with the second user 104. The second policy 116 may be the same as, or different from, the first policy 116 based on the data/information described above with respect to step 304.

At 308, the service provider 102 may identify a URL 126 sent by the first user 104 to the second user 104 via the chat 120. During the communication session between the first user 104 and the second user 104, one of the users 104 (i.e., the first user 104) may include a URL 126 or a link within an electronic message 124. The service provider 102 may identify that URL 126 and, instead of merely causing the URL 126 to be rendered on the second user device 106, the service provider 102 may determine whether and how the URL 126 is to be unfurled for the second user 104.

At 310, the service provider 102 may determine an extent of unfurling of the URL 126 based on the first policy 116 and/or the second policy 116. In particular, the service provider 102 may determine whether the URL 126 should be unfurled. If so, the service provider 102 may determine if the URL 126 is to be unfurled using a server-based unfurling process and/or a client-based unfurling process. For instance, the service provider 102, based on the first policy 116 and/or the second policy 116, may determine that the URL 126 is first attempted to be unfurled by the server-based unfurling service 108. If the server-based unfurling service 108 is unable to unfurl the URL 126, such as because the URL 126 corresponds to a restricted or private site, the service provider 102 may deploy client based unfurling (e.g., sender-based unfurling 216 and/or recipient-based unfurling 218). Provided that the URL 126 is unfurled, the user device 106 of the second user 104 may render an unfurled URL 130 that includes a preview of the site corresponding to the URL 126 (e.g., a title/heading, descriptive text, images, video, etc.), which may result in a richer user experience.

FIG. 4 is a flow diagram of an illustrative process 400 to unfurl a URL using sender-based client unfurling. The process 400 is described with reference to the environment 100 and the computing architecture 200 illustrated in FIGS. 1 and 2, respectively. Of course, the process 400 may be performed in other similar and/or different environments.

At 402, the service provider 102 may identify a first user 104 and a second user 104 that are engaged in a chat 120. Although a chat 120 is discussed with respect to FIG. 4, it is contemplated that the first user 104 and the second user 104 may be engaging in any type of communication session, including e-mail messages 124, text messages 124, and so on. Via the communication session, the first user 104 and the second user 104 may exchange electronic messages 124 with one another.

At 404, the service provider 102 may identify a URL 126 sent by the first user 104 to the second user 104. During the communication session, the service provider 102 may determine that the first user 104, via a first user device 106, sent an electronic message 124 to the second user 104, via a second user device 106, and that the electronic message 124 contains a URL 126 (or a link).

At 406, the service provider 102 may determine that a server-based unfurling service 108 is unable to unfurl the URL 126. One or more policies 116 associated with the first user 104 and/or the second user 104 may indicate that server-based unfurling is to be attempted prior to client-based unfurling. As a result, the server-based unfurling service 108 may attempt to obtain URL metadata 128 associated with the URL 126. However, if the URL 126 corresponds to a restricted or private site (e.g., an intranet site), the server-based unfurling service 108 may be unable to access the site via the URL 126. The service provider 102 may receive an error message/notification indicating such a failure.

At 408, the service provider 102 causes, based on one or more policies 116, a first user device 106 of the first user 104 to obtain URL metadata 128 associated with the URL 126. For instance, the one or more policies 116 may indicate that the first user device 106 (i.e., the sending user device 106) is to obtain the URL metadata 128 from the remote resource(s) 110 to unfurl the URL 126.

At 410, the service provider 102 may cause the first user device 106 to unfurl the URL 126 using the URL metadata 128 to generate an unfurled URL 130. The unfurled URL 130 may include a title/heading of the website/site corresponding to the URL 126, descriptive text corresponding to the URL 126, and/or images/video that are visually descriptive of the site/website corresponding to the URL 126.

At 412, the service provider 102 may cause the first user device 106 to send the unfurled URL 130 and the URL metadata 128 to a second user device 106 of the second user 104. In various embodiments, the policies 116 may indicate that the sending user device 106 is to send both the unfurled URL 130 as well as the URL metadata 128 to the recipient user device 106. For instance, the policies 116 may dictate the sending of the URL metadata 128 if both the first user 104 and the second user 104 are associated with the same entity (e.g., employees of the same company), and/or if the first user 104, the second user 104, and/or the URL 126 are determined to be trusted.

At 414, the service provider 102 may cause a display of the second user device 106 to render the unfurled URL 130. As a result, instead of merely rendering the URL 126 itself, the second user device 106 may render the unfurled URL 130, which may be a preview of the site/website corresponding to the URL 126 (e.g., a title/heading, descriptive text, images, video, etc.).

FIG. 5 is a flow diagram of an illustrative process 500 to unfurl a URL using recipient-based client unfurling. The process 500 is described with reference to the environment 100 and the computing architecture 200 illustrated in FIGS. 1 and 2, respectively. Of course, the process 500 may be performed in other similar and/or different environments.

At 502, the service provider 102 may identify a first user 104 and a second user 104 that are engaged in a chat 120. Although a chat 120 is discussed with respect to FIG. 5, it is contemplated that the first user 104 and the second user 104 may be engaging in any type of communication session, including e-mail messages 124, text messages 124, and so on. Via the communication session, the first user 104 and the second user 104 may exchange electronic messages 124 with one another.

At 504, the service provider 102 may identify a URL 126 sent by the first user 104 to the second user 104. During the communication session, the service provider 102 may determine that the first user 104, via a first user device 106, sent an electronic message 124 to the second user 104, via a second user device 106, and that the electronic message 124 contains a URL 126 (or a link).

At 506, the service provider 102 may determine that a server-based unfurling service 108 is unable to unfurl the URL 126. One or more policies 116 associated with the first user 104 and/or the second user 104 may indicate that server-based unfurling is to be attempted prior to client-based unfurling. As a result, the server-based unfurling service 108 may attempt to obtain URL metadata 128 associated with the URL 126. However, if the URL 126 corresponds to a restricted or private site (e.g., an intranet site), the server-based unfurling service 108 may be unable to access the site via the URL 126. The service provider 102 may receive an error message/notification indicating such a failure.

At 508, the service provider 102 may determine one or more policies 116 associated with the first user 104 and/or the second user 508. As stated herein, the policies 116 may be generated by the service provider 102 or an entity associated with the users 104, and may indicate an extent of unfurling of URLs 126 with respect to the first user 104 and the second user 104.

At 510, the service provider 102 may cause a first user device 106 of the first user 104 to send the URL 126, but not URL metadata 128, to a second user device 106 of the second user 104. In various embodiments, the policies 116 may indicate that a recipient-based unfurling 218 is to be performed, possibly because the first user 104 and the second user 104 are not associated with the same entity. Or the service provider 102 may have determined that content sent from the first user 104 is not to be trusted by the second user 104. As a result, although the first user device 106 may have obtained URL metadata 128 associated with the URL 126 from the remote resource(s) 110, the URL metadata 128 will not be sent from the first user device 106 to the second user device 106.

At 512, the service provider 102 may cause, based on the one or more policies 116, the second user device 106 to obtain the URL metadata 128. Provided that the policies 116 indicate that recipient-based unfurling 218 is preferred, the second user device 106 may obtain the URL metadata 128 associated with the URL 126 from the remote resource(s) 110.

At 514, the service provider 102 may cause the second user device 106 to unfurl the URL 126 using the URL metadata 128 to generate an unfurled URL 130. Due to the policies 116 indicating that recipient-based unfurling 218 is to occur, the second user device 106 may unfurl the URL 126, as opposed to the first user device 106 unfurling the URL 126 pursuant to sender-based unfurling 216.

At 516, the service provider 102 may cause a display of the second user device 106 to render the unfurled URL 130. As a result, instead of merely rendering the URL 126 itself, the second user device 106 may render the unfurled URL 130, which may be a preview of the site/website corresponding to the URL 126 (e.g., a title/heading, descriptive text, images, video, etc.). Accordingly, both sender-based unfurling 216 and recipient-based unfurling 218 of a URL 126 may cause an unfurled URL 130 to be rendered by the second user device 106 (i.e., the recipient user device 106).

Figure 6:
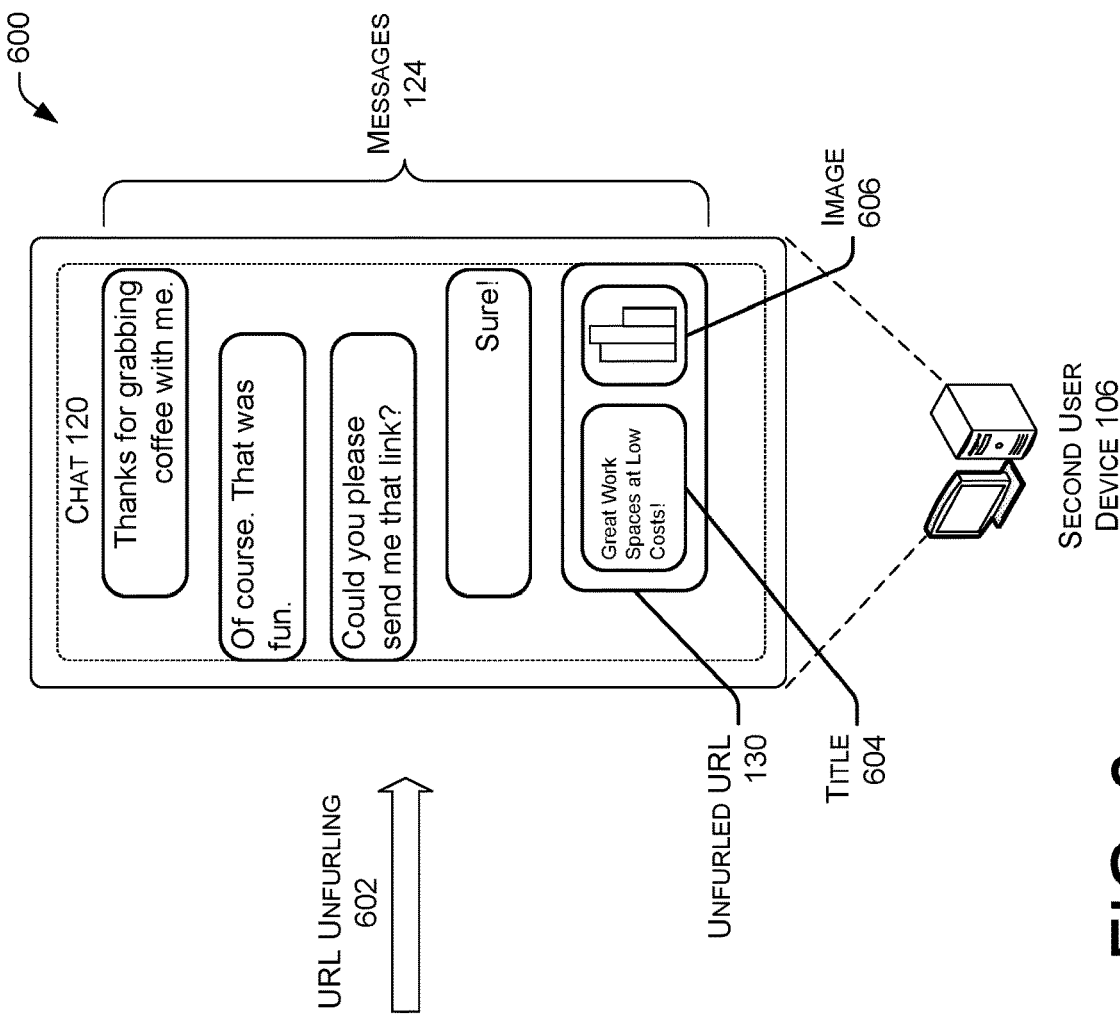
FIG. 6 is a diagram illustrating a sending user device, a recipient user device, a URL sent by the sending user device, and an unfurled URL displayed via the recipient user device.
Figure 6:
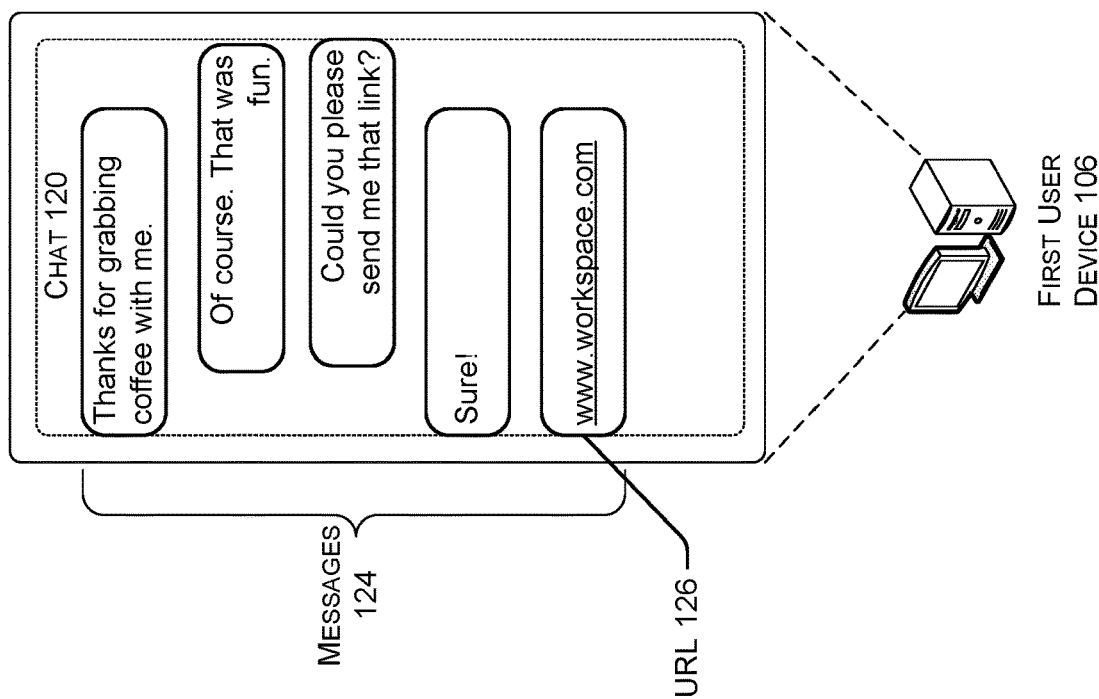

FIG. 6 is an illustrative diagram 600 representing the unfurling of a URL contained within an electronic message exchanged between two user devices. The diagram includes a first user device 106 and a second user device 106 that are engaging in a communication session, which may include any type of electronic messages 124 exchanged between the user devices 106 (e.g., e-mail messages 124, text messages 124, chat messages 124, etc.).

As shown, a first electronic message 124 sent by a first user 104 via the first user device 106 states "Thanks for grabbing coffee with me." A second user 104 of the second user device 106 responds with "Of course. That was fun." and "Could you please send me that link?" In response, electronic messages 124 from the first user device 106 state "Sure!" and "www.workspace.com." Accordingly, the last electronic message 124 sent via the first user device 106 includes a URL 126. Instead of the second user device 106 merely rendering the URL 126/link, the URL 126 may be unfurled (e.g., URL unfurling 602). For the purposes of FIG. 6, the URL 126 may be unfurled in any manner, such as via server-based unfurling and/or client-based unfurling, which may include sender-based unfurling 216 and/or recipient-based unfurling 218. Regardless of whether the server-based unfurling service 108, the first user device 106, and/or the second user device 106 unfurls the URL 126, URL metadata 128 associated with the URL 126 may be obtained/extracted from the remote resource(s) 110.

The service provider 102 may cause the URL metadata 128 to be incorporated into the unfurled URL 130. Moreover, as a result of the unfurling of the URL 126, the unfurled URL 130 may be rendered by the second user device 106. As illustrated in FIG. 6, the first user device 106 that sent the URL 126 within the electronic message 124 only shows the URL 126 itself, whereas the second user device 106 renders the unfurled URL 130, as opposed to just the URL 126 itself. The unfurled URL 130 may serve as a preview of the site/website corresponding to the URL 126. For instance, and as illustrated in FIG. 6, the unfurled URL 130 may include a title 604 or heading of an article or other content located at the URL 126 ("Great Work Spaces at Low Costs!"), as well as an image 606 that is visually descriptive of the URL 126/website. In other embodiments, the unfurled URL 130 may include descriptive text that indicates content located at the URL 126 and/or videos. Therefore, without actually selecting the URL 126, the second user 104 may obtain information about the URL 126/website via the unfurled URL 130.

Figure 7:
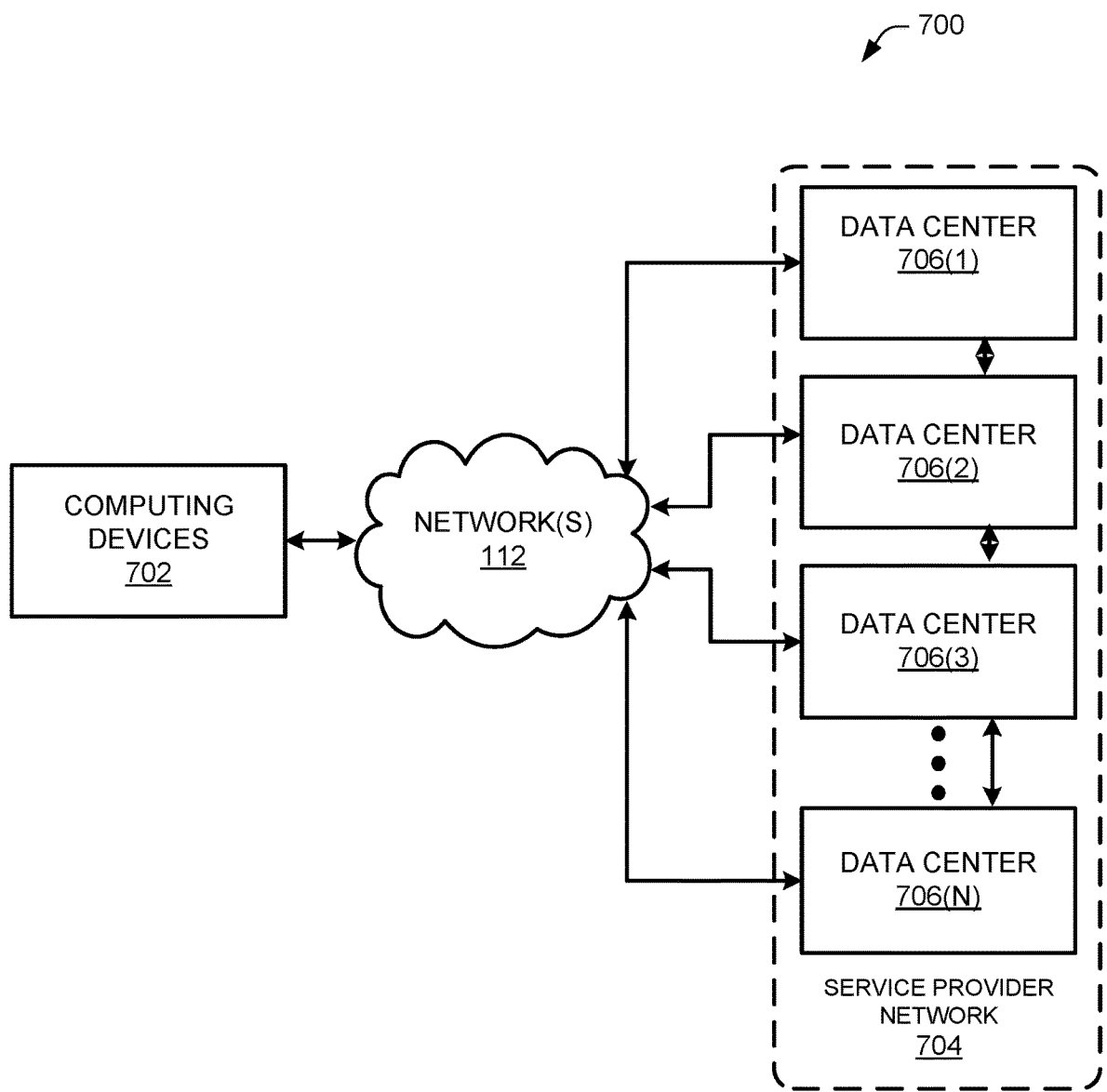
FIG. 7 is a block diagram that shows one illustrative operating environment for the examples disclosed herein that includes a service provider network.

FIG. 7 is a block diagram that shows an illustrative operating environment 700 for the examples disclosed herein that includes a service provider network. FIG. 7 and the following description are intended to provide a brief, general description of a suitable computing environment in which the examples described herein may be implemented. In particular, FIG. 7 is a system and network diagram that shows an illustrative operating environment that includes one or more computing devices 702 and a service provider network 704. As discussed above, service provider network 704 can provide virtual machine instances and computing resources on a permanent or an as-needed basis.

The computing resources provided by the service provider network 704 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 704 are enabled in one implementation by one or more data centers 706(1)-706(N) (which may be referred to herein singularly as "a data center 706" or collectively as "the data centers 706"). The data centers 706 are facilities utilized to house and operate computer systems and associated components. The data centers 706 typically include redundant and backup power, communications, cooling and security systems. The data centers 706 might also be located in geographically disparate locations. One illustrative configuration for a data center 706 that implements some or all of the concepts and technologies disclosed herein will be described below with regard to FIG. 8.

The users and customers of service provider network 704 may access the computing resources provided by the data centers 706 over a suitable data communications network, such as a Wide Area Network ("WAN"), as illustrated by network(s) 112. Although a WAN might be used, it should be appreciated that a local-area network ("LAN"), the Internet, or any other networking topology known in the art that connects the data centers 706 to the computing devices 702 (such as the user devices 106 illustrated in FIG. 1) may be utilized. It should also be appreciated that combinations of such networks might also be utilized.

FIG. 8 is a block diagram that illustrates an illustrative architecture 800 of one configuration for a data center 706 that implements aspects of the service provider network 704, including some or all of the concepts and technologies disclosed herein. The example data center 706(1) shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an example, the server computers 802 are configured to execute the software products as described above.

In an example, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager capable of instantiating and managing computing resources and instances of computing resources. In the case of virtual machine instances, for example, the instance manager might be a hypervisor or another type of program configured to enable the execution of multiple virtual machine instances on a single server computer 802, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 706(1) shown in FIG. 8 also includes a server computer 802F reserved for executing software components for managing the operation of the data center 706(1), the server computers 802, virtual machine instances, and other resources within the service provider network 704. The server computer 802F might also execute one or more managers 808 and include one or more data stores 810. In this regard, it should be appreciated that while these components are illustrated as executing within service provider network 704, computing systems that are external to service provider network 704 might also be utilized to execute some or all of these components. Other configurations might also be utilized.

In the example data center 706(1) shown in FIG. 8, an appropriate local area network ("LAN") 806 is utilized to interconnect the server computers 802A-802E and the server computer 802F. The LAN 806 is also connected to the network(s) 112 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 706(1)-706(N), between each of the server computers 802A-802F in each data center 706 and between virtual machine instances and other types of computing resources provided by the service provider network 704.

It should be appreciated that the data center 706(1) described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
one or more processors; and
memory storing computer-executable instructions that, when executed, cause the one or more processors to:
determine, by one or more devices associated with a service provider, that a first user and a second user are engaged in an electronic chat session;
determine, by the one or more devices, that an electronic chat message sent from a first user device of the first user to a second user device of the second user contains a Uniform Resource Locator (URL);
identify, by the one or more devices, a policy associated with at least one of the first user or the second user, the policy indicating an extent of unfurling of URLs with respect to the at least one of the first user or the second user;
send, by the one or more devices and based on the policy and to a device associated with a cloud-based unfurling service, a first instruction to unfurl the URL;
receive, by the one or more devices, an indication that the cloud-based unfurling service is unable to access data referenced by the URL;
send, by the one or more devices, based on the policy and the indication, and to the first user device, a second instruction to extract URL metadata associated with the URL, the URL metadata being extracted from a website corresponding to the URL based on at least one of a header of the website, a body of the website, a Hypertext Markup Language (HTML) title of the website, or a metatag associated with the website;
cause, by the one or more devices and based on the first user device executing the second instruction, the first user device to send, with the electronic chat message and to the second user device, the URL metadata and an unfurled URL associated with the URL, the unfurled URL being generated based on the URL metadata; and
cause, by the one or more devices, the second user device to render the unfurled URL, the unfurled URL including a preview of the website, the preview including at least one of a heading, descriptive text, an image, or a video associated with the website.

2. The system as recited in claim 1, wherein the extent of unfurling of URLs is based on at least one of a type of client being used to engage in the chat session, first characteristics associated with the URL, or second characteristics associated with at least one of the first user or the second user.

3. The system as recited in claim 2, wherein the computer-implemented instructions are further executable by the one or more processors to determine that the type of client being used to engage in the chat session includes a desktop web browser, a mobile browser, a desktop application, or a mobile application.

4. The system as recited in claim 2, wherein the computer-implemented instructions are further executable by the one or more processors to determine that the first characteristics associated with the URL include a domain associated with the URL, a physical location associated with the URL, and whether the URL is included in a list of known URLs.

5. The system as recited in claim 2, wherein the computer-implemented instructions are further executable by the one or more processors to determine that the second characteristics include at least one of an employment status, a level, or a role of the at least one of the first user or the second user.

6. A method comprising:
   determining, by one or more devices associated with a service provider, that a first user, via a first user device, sent an electronic message that contains a resource locator (RL) to a second user device of a second user;
   determining, by the one or more devices, a policy associated with at least one of the first user or the second user, the policy indicating an extent of unfurling of RLs with respect to the at least one of the first user or the second user;
   determining, by the one or more devices and based on an error notification received from a server-based unfurling service, that the server-based unfurling service was unable to access data referenced by the RL;
   sending, by the one or more devices, based at least in part on the policy and the error notification, and to the first user device, an instruction to unfurl the RL to generate an unfurled RL that depicts at least one of textual information or visual information associated with the data referenced by the RL, the first user device executing the instruction to generate the unfurled RL;
   at least one of:
      sending, by the one or more devices, the unfurled RL to the second user device; or
      causing, by the one or more devices, the first user device to send the unfurled RL to the second user device; and
   causing, by the one or more devices, the second user device to render the unfurled RL.

7. The method as recited in claim 6, further comprising sending, based at least in part on the policy and prior to determining that the server-based unfurling service was unable to access the data associated with the RL, a second instruction for the server-based unfurling service to unfurl the RL.

8. The method as recited in claim 6, further comprising:
   causing the first user device to obtain RL metadata associated with the RL from a site corresponding to the RL, the RL metadata being used by the first user device to unfurl the RL to generate the unfurled RL; and
   storing the RL metadata, the RL metadata to be used to unfurl one or more RLs at a subsequent time.

9. The method as recited in claim 8, further comprising sending, based at least in part on the policy and to the first user device, a second instruction to send the unfurled RL and the RL metadata to the second user device.

10. The method as recited in claim 8, wherein the RL metadata extracted from the site is extracted from at least one of a header of the site, a body of the site, a Hypertext Markup Language (HTML) title of the site, or a metatag associated with the site.

11. The method as recited in claim 6, wherein the unfurled RL includes a preview of a site corresponding to the RL, the preview including at least one of a heading, a title, descriptive text, an image, or a video associated with the site.

12. The method as recited in claim 6, wherein the extent of unfurling of RLs is based on at least one of:
   a type of client being used to engage in a communication associated with the electronic message, the type of client including a desktop web browser, a mobile browser, a desktop application, or a mobile application;
   one or more first characteristics associated with the RL, the one or more first characteristics including at least one of a domain associated with the RL, a physical location associated with the RL, or whether the RL is included in a list of known RLs; or
   one or more second characteristics associated with at least one of the first user or the second user, the one or more second characteristics including at least one of an employment status, a level, or a role of the at least one of the first user or the second user.

13. The method as recited in claim 6, wherein the instruction to unfurl the RL includes an indication for the first user device to refrain from sending the RL metadata to the second user device, the indication being based at least in part on the policy.

14. The method as recited in claim 6, wherein the electronic message is sent to the second user and a third user at a same time, and wherein the first user, the second user, and the third user are exchanging electronic messages via a group chat room, a group e-mail, or a group text message exchange.

15. The method as recited in claim 6, wherein:
   the RL is associated with a site of an entity;
   authorization to access to the site is limited to a set of users that are associated with the entity; and
   the server-based unfurling service is not included in the set of users.

16. A method comprising:
   determining, by one or more devices associated with a service provider, that a first user, via a first user device, sent an electronic message that contains a resource locator (RL) to a second user device of a second user;
   determining, by the one or more devices, a policy associated with at least one of the first user or the second user, the policy indicating an extent of unfurling of RLs with respect to the at least one of the first user or the second user;
   determining, by the one or more devices and based at least in part on a determination that the RL is included in a list of known RLs in which access is authorized to a limited set of users, that a server-based unfurling service was unable to access data referenced by the RL;
   sending, by the one or more devices, based at least in part on the policy, and to the second user device, an instruction to unfurl the RL to generate an unfurled RL that depicts at least one of textual information or visual information associated with the data referenced by the RL, the second user device executing the instruction to generate the unfurled RL; and
   causing, by the one or more devices, the second user device to render the unfurled RL.

17. The method as recited in claim 16, further comprising causing the second user device to obtain RL metadata associated with the RL from a site corresponding to the RL, the RL metadata being used by the second user device to unfurl the RL to generate the unfurled RL.

18. The method as recited in claim 16, wherein the extent of unfurling of RLs is based on at least one of:
   a type of client being used to engage in a communication associated with the electronic message, the type of client including a desktop web browser, a mobile browser, a desktop application, or a mobile application;
   one or more first characteristics associated with the RL, the one or more first characteristics including at least one of a domain associated with the RL, a physical location associated with the RL, or whether the RL is included in a list of known RLs; or
   one or more second characteristics associated with at least one of the first user or the second user, the one or more second characteristics including at least one of an employment status, a level, or a role of the at least one of the first user or the second user.

19. The method as recited in claim 18, wherein the policy indicates that the first user device is to refrain from sending the unfurled RL and RL metadata associated with the RL to the second user device.

20. The method as recited in claim 16, wherein the unfurled RL includes a preview of a site corresponding to the RL, the preview including at least one of a heading, a title, descriptive text, an image, or a video associated with the site.

\* \* \* \* \*